Dec. 9, 1958 R. S. KOFFORD 2,863,420
AUTOMATIC POULTRY FEEDER
Filed Jan. 22, 1957 3 Sheets-Sheet 1
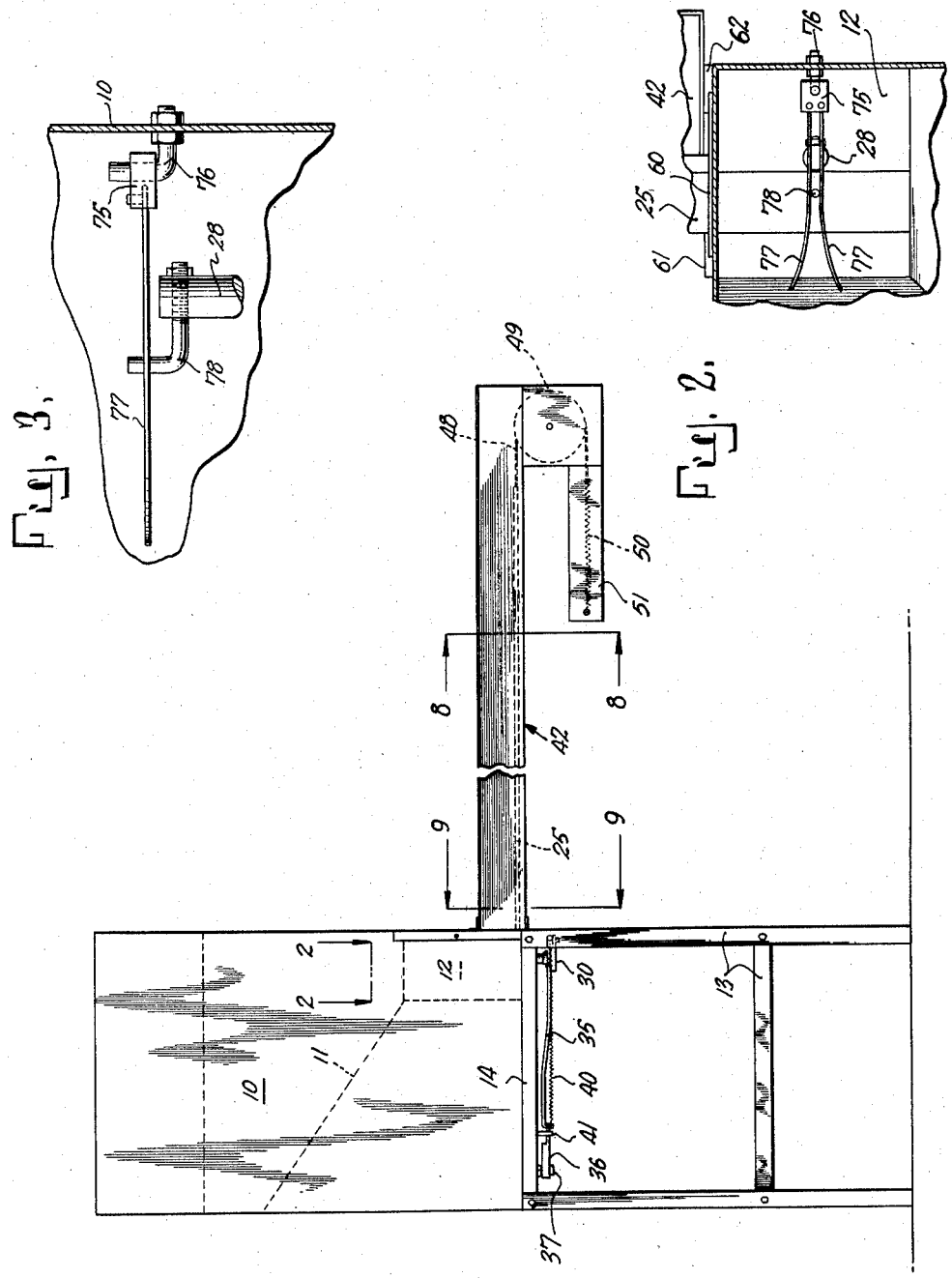
INVENTOR.
REED S. KOFFORD
BY Robert C. Comstock
ATTORNEY

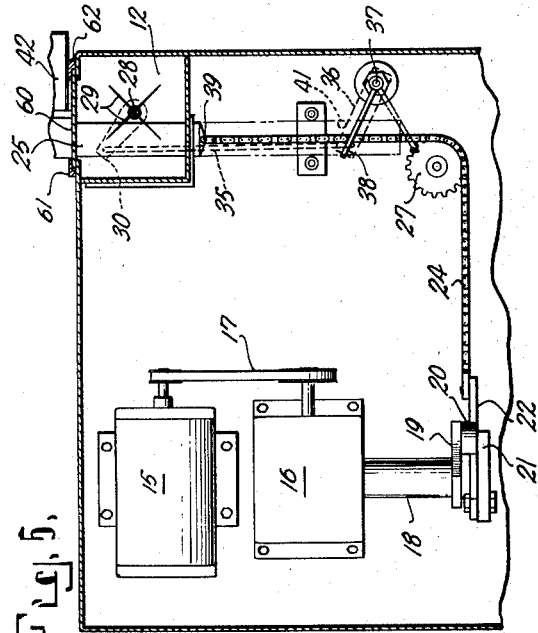
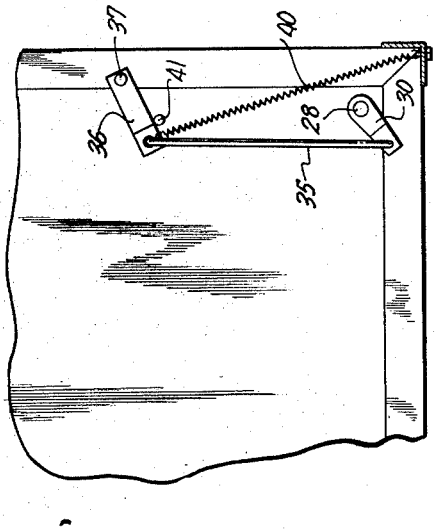
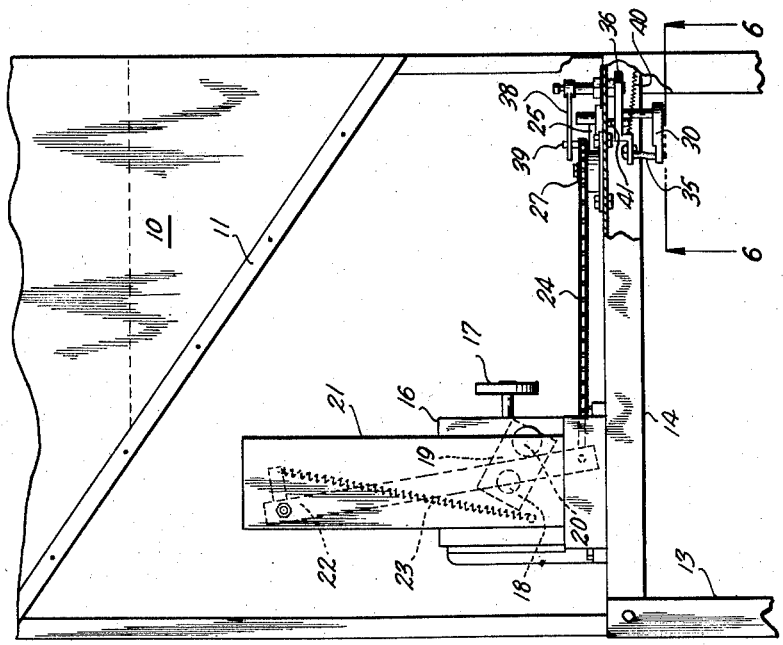

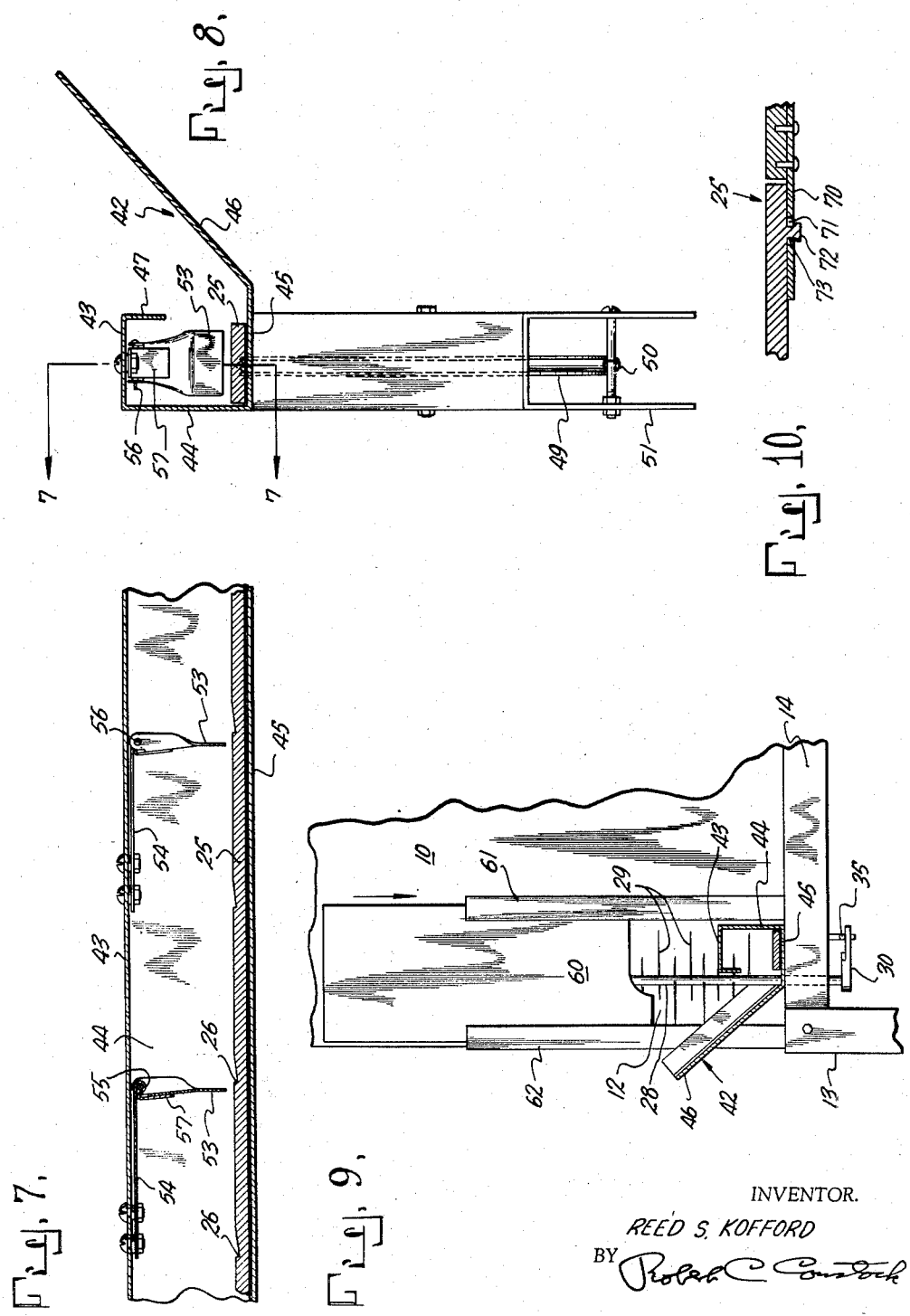

United States Patent Office 2,863,420
Patented Dec. 9, 1958

2,863,420

AUTOMATIC POULTRY FEEDER

Reed S. Kofford, Van Nuys, Calif.

Application January 22, 1957, Serial No. 635,253

4 Claims. (Cl. 119—52)

This invention relates to an automatic poultry feeder.

Various types of devices have been constructed in the past for the purpose of automatically supplying feed to poultry, particularly those kept in cages. Among the principal objections to such devices have been their great expense and their complexity.

It is accordingly an object of my invention to provide a poultry feeder which is particularly adapted for use in automatically supplying the desired quantity and type of feed to a plurality of cages and which is essentially simple and therefore economical to construct, operate and maintain. With my invention, the number and type of moving parts and their operation have been reduced and simplified to the point where my feeder is within the economic reach of the average poultryman.

It is among the further objects of my invention to provide a feeder which supplies the same type of feed to all of the poultry and in which the feed cannot be picked over by any of the poultry; to provide a feeder in which no overload control is necessary and all spillage and waste of feed is completely eliminated; to provide a feeder which cannot be blocked or damaged by foreign substances, mechanical failure or other circumstances; and to provide a feeder which stimulates feeding by providing a movement which attracts the instinctive attention of the poultry.

My invention also has numerous other objects, advantages and capabilities, as will further more fully appear, and which are inherently possessed by my invention.

While I have shown in the accompanying drawings a preferred embodiment of my invention, it should be understood that the same is susceptible of modification and change without departing from the spirit of my invention.

Referring to the drawings, Fig. 1 is a side elevational view of my complete poultry feeder, with the hopper section shown at the left and the trough or conveyer section shown at the right being broken away to indicate an extended and indeterminate length;

Fig. 2 is a top plan view of the feed channel taken on line 2—2 of Fig. 1;

Fig. 3 is an enlarged side elevational view of the feed agitator shown in Fig. 2;

Fig. 4 is a front elevational view of the hopper portion of my poultry feeder, partly broken away;

Fig. 5 is a top plan view of the hopper portion of my poultry feeder, broken away at the top and bottom;

Fig. 6 is a bottom plan view taken from beneath a part of the hopper portion of my poultry feeder;

Fig. 7 is an enlarged detailed sectional view of a portion of the conveyer taken on line 7—7 of Fig. 8;

Fig. 8 is an enlarged sectional view taken on line 8—8 of Fig. 1;

Fig. 9 is an enlarged sectional view taken on line 9—9 of Fig. 1;

Fig. 10 is an enlarged sectional view showing the connection of two lengths of feed bar.

A preferred embodiment which has been selected to illustrate my invention comprises a feed hopper 10, which is adapted to hold a substantial quantity of any desired type of feed. The hopper has a pair of slanted bottom walls 11, which extend diagonally downwardly like a funnel toward a vertically extending feed channel 12, which is disposed adjacent one corner of the hopper 10.

The hopper 10 is mounted on a frame work 13, which supports it in such a manner as to hold the feed above the conveyer portion of my feeder and permit the feed to be supplied by gravity with assistance from agitation means hereinafter described.

Also supported by the framework 13 is a base plate 14, on which are mounted most of the operating mechanisms of my feeder. Mounted on the base plate 14 beneath the hopper 10 is an electric motor 15, which is adapted to be operated from any suitable source of electrical supply. In use, it is contemplated that a timing control of a conventional type (not shown) would be used to operate my feeder at desired intervals. A speed reducer 16 is mounted on the base plate 14 adjacent to the motor 16 and is connected thereto by a pulley 17. The reducer 16 causes a shaft 18 to rotate.

Attached to the end of the rotating shaft 18 is a crank 19, which carries a roller 20. A stanchion 21 extends upwardly from the base plate 14 adjacent the end of the shaft 18. A bar 22 is pivotally attached to the stanchion 21 adjacent the upper end thereof. The bar 22 depends downwardly therefrom, with the lower portion of the bar 22 being engaged by the roller 20 as the crank 19 moves along its circular path. The bar 22, roller 20 and crank 19 act in a cam-like manner to translate the rotary output of the reducer 16 into reciprocal movement of the lower end of the bar 22.

A coil spring 23 is attached at one end thereof adjacent the bottom of the stanchion 21 and at its opposite end adjacent the top of the bar 22. Its purpose is to pull the bar 22 away from the roller 20 and crank 19 to an idling position at the left of Fig. 4 in case of mechaical failure of the feed bar system.

Attached to the lower end of the bar 22 is one end of a link chain 24. The link chain 24 extends around a sprocket 27 which is mounted on the base plate 14 and then extends at a right angle toward the feed channel 12, adjacent which it is attached to one end of a feed bar 25. The feed bar 25 preferably comprises one or more substantially flat pieces of metal similar to conventional flat bar stock, except that the feed bar 25 is provided at spaced intervals with notches or serrations 26, which facilitate movement of the feed.

In use, the feed bar 25 customarily comprises a plurality of attached lengths of identically formed bars extending for the entire length of the row of cages to be supplied by my feeder. In practice, this distance is often as much as several hundred feet. The operation of my feeder is exactly the same, regardless of the length of the feed bars 25.

The ends of the feed bars 25 are connected to each other in the manner shown in Fig. 10 of the drawings. The end of one feed bar 25 has a connector link 70 attached to the under side thereof. The connector link 70 has a circular opening 71 therein. The end of the other feed bar 25 is provided with a downwardly directed circular stud 72 having an undercut groove 73 adjacent the under side of the bar 25. The stud 72 extends through the opening 71 and the connector link 70 is held within the groove 73 by pressure exerted on the feed bar 25 to which it is attached, which pressure results from a coil spring 50 which is hereinafter described.

Referring to Fig. 5 of the drawings and particularly the upper right hand corner thereof, it will be noted that the end of the feed bar 25 extends through the bottom of the feed channel 12, so that the feed which falls downwardly from the hopper 10 is carried out from the bottom of the feed channel 12 by the reciprocal movement of the feed bar 25. This reciprocal movement is in turn caused by movement of the link chain 24 and bar 22.

It is, of course, well known that feed will not flow evenly from a hopper by gravity alone. It naturally tends to clog and block. In order to overcome this tendency, I provide two types of agitators, the operation of which is controlled by and supplied from the same source of energy which moves the feed bar 25.

One of the agitators includes an upstanding shaft 28, which is mounted in the center of the feed channel 12. Attached to the shaft 28 at spaced intervals are a plurality of fingers 29, which are preferably formed of spring steel wire. The bottom of the shaft 28 extends through the base plate 14 and is attached to and rotated by a ratchet arm 30. A ratchet movement is believed to be preferable to a reciprocal movement, because it avoids creation of a stalemate or block in supplying the feed.

The other agitator comprises a pivot block 75 which is rotatably mounted on a pivot pin 76 which is attached to the side of the hopper 10. Extending outwardly from the pivot block 75 are a pair of elongated wires 77. A right angular member 78 is attached to the top of the shaft 28 and has one arm extending between the wires 77. As the shaft 28 rotates, the right angular member 78 causes the wires 77 to move in a reciprocal arcuate path to stir the feed and cause it to flow downwardly into the feed channel 12.

The ratchet arm 30 which rotates the agitator shaft 28 is connected to one end of a rod 35, which extends beneath and parallel to the base plate 14. The other end of the rod 35 is attached to the free end of an arm 36, the other end of which is attached to a shaft 37 which extends upwardly through the base plate 14. On the upper side of the base plate 14 a second arm 38 is attached to the shaft 37. The second arm 38 extends parallel to the arm 36. A pin 39 which extends upwardly from the end of the feed bar 25 engages the second arm 38 during reciprocal movement of the feed bar 25. This results in pivotal movement of the second arm 38, rotary movement of the shaft 37, pivotal movement of the arm 36, reciprocal movement of the rod 35 and pivotal movement of the ratchet arm 30, causing rotation of the agitator shaft 28.

The arms 36 and 38 are normally urged toward one position by a coil spring 40, one end of which is attached to the end of the arm 36 and the other end of which is attached to the framework 13 as shown in Fig. 6 of the drawings. The coil spring 40 normally holds the arm 36 in engagement with the stop pin 41 which extends downwardly from the base plate 14 adjacent the arm 36.

The feed bar 25 is slidably mounted in a trough 42, which extends for the entire length of the poultry cages. The trough 42 as shown in section in Figs. 8 and 9 of the drawings comprises a top 43, side 44, bottom 45, diagonal side 46 and lip 47. The feed bar 25 is slidably mounted on the bottom 45 and lies within the rectangular closed area defined by the top 43, side 44, bottom 45 and lip 47.

The end of the feed bar or bars 25 remote from the hopper 10 is attached to a chain 48, which passes around a reel 49, which is rotatably mounted beneath the end of the trough 42. The opposite end of the chain 48 is attached to one end of a coil spring 50. The opposite end of the coil spring 50 is attached to the end of a housing 51 which extends beneath the end of the trough 42 and parallel thereto.

It will thus be seen that the coil spring 50 normally urges the feed bar 25 away from the hopper 10, while the crank 19 and roller 20 act on the bar 22 to move the feed bar 25 toward the hopper 10.

The feed bar 25 is provided along its entire length with a series of spaced notches 26, which are deepest at the end thereof toward the hopper 10. The notches 26 act to hold the feed as it falls on to the feed bar 25 and as it moves away from the hopper 10, while also permitting sliding movement of the feed bar 25 beneath the feed when the feed bar 25 moves back toward the hopper 10.

The trough 42 contains a series of spaced identically formed paddles 53, which depend downwardly from the top 43 of the trough 42. Each of the paddles 53 is substantially shovel shaped and is mounted on one end of an elongated paddle arm 54, which is preferably formed of spring steel. The opposite end of the paddle arm 54 is attached to the top 43 of the trough 42. The end of the paddle arm 54 to which the paddle 53 is attached is bent in substantially a complete circle to provide a bearing 55. A pin 56 extends through a pair of aligned openings in the sides of the paddle 53 and through the bearing 55 to pivotally mount the paddle 53. The end of the paddle arm 54 continues beyond the bearing 55 to provide a stop portion 57 which is disposed behind and directly parallel to the back of the paddle 53. It is thus possible for the paddle 53 to pivot away from the hopper 10 but not toward the hopper 10, such movement being substantially prevented by the spring stop portion 57.

The paddles 53 are spaced along the trough 42 a distance somewhat less than the length of the reciprocal movement of the feed bar 25. The reciprocal movement of the feed bar 25 will thus carry the feed from one paddle 53 to the next paddle 53. When the feed bar 25 moves back toward the hopper 10, the paddles 53 prevent backward movement of the feed. It will be noted that the paddles 53 are free to pivot away from the hopper 10 to permit the feed to pass under them in an outward direction only.

The operation of my poultry feeder is believed to be substantially obvious from the description set forth above. Operation of the electric motor 15 results in reciprocal movement of the bar 22, causing reciprocal movement of the feed bar 25. Feed drops from the hopper 10 on to the feed bar 25 through the feed channel 12. Movement of the feed is facilitated by the agitator devices which are operated simultaneously with the feed bar 25.

In order to provide access to the feed channel 12, I provide a door 60, which is slidably mounted in a pair of side channels 61 and 62 along the portion of the feed channel 12 which is adjacent to the feed trough 42. The door 60 is adapted to be slid upwardly to permit access to the feed channel 12 and the agitator devices. The door 60 is normally kept in downward position, with only a sufficient opening for the movement of the feed bar 25 and feed from the feed channel 12.

In use, my feeder has a number of advantages which may not be readily apparent from the drawings and description. For example, as the feed moves along the feed bar 25, it spills out between the lip 47 and the diagonal side 46 of the trough 42 until it reaches a height substantially equal to the bottom of the lip 47 of the trough 42. If all of the poultry should stop eating, the trough 42 will become filled to this level, but no higher. No feed will spill out of the trough 42. The paddles 53 will be held adjacent the top 43 and the feed bar 25 will continue to slide along the bottom 45, and the feed will remain stationary. It is not necessary to stop the operation of the feeder and there will be no spillage or waste, regardless of the length of time the feeder operates under such conditions.

It will also be noted that the feed is not forced and that it merely moves along the feed bar 25. If only some of the poultry are feeding, the feed will spill out only at the places where it is eaten away.

It will also be noted that the feed is always enclosed within a substantially closed area of the trough 42 until it is spilled out. It is thus impossible for the poultry disposed adjacent the hopper 10 to pick over the feed. This is important, since the poultry naturally tend to select the more desirable portions of the feed. If those adjacent to the hopper 10 can pick the feed over, they will have too rich a diet while the poultry at the opposite end of the feeder will have too lean a diet.

The agitator means of my feeder are so disposed that rocks, bolts or other foreign matter can easily move through them without blocking their operation. The spring paddle arms 54 also permit sufficient flexing to enable the paddles 53 to overcome such blocking.

If anything should interfere with the movement of the feed bar 25, the cam type of drive used with my feeder is actually free from the motor 15 and such interference will only cause the arm 22 to idle. The crank 19 will continue to rotate and there will be no overload on the motor 15.

Another advantage of my feeder which is also not readily apparent from the drawings and description is that in normal use the feeding action is instantaneous along the entire length of the trough. When the feeder is not operating, there is a substantial amount of feed which is held within the closed area of the trough 42, out of reach of the poultry. When the feed bar 25 moves, this feed is dispensed simultaneously and instantaneously along the entire length of the trough 42. It is thus not necessary for the poultry at the far end of the trough 42 to wait for feed to reach them.

There are numerous other advantages which are inherent in the structure and operation of my automatic poultry feeder and which become readily apparent to poultrymen when my feeder is in use.

I claim:

1. In an automatic poultry feeder, an elongated stationary trough, an elongated substantially flat bar slidably mounted within said trough, the bottom of said feed bar slidably engaging said trough, means for sliding said feed bar longitudinally along said trough with oscillating forward and backward movements, a plurality of pivotal paddles transversely mounted across and spaced along said trough, the distance between each pair of said paddles being less than the distance of oscillatory movement of said feed bar, means for supplying feed to the upper surface of said feed bar, each of said paddles being mounted for limited pivotal movement whereby said paddles are disposed toward a horizontal position with respect to said trough when said feed bar is moved in a forward direction to permit the feed to be carried by said feed bar beneath said paddles along said trough in a forward direction and said paddles are disposed toward a vertical position with respect to said trough when said feed bar is moved in a backward direction to prevent the backward movement of said feed beneath said paddles.

2. In an automatic poultry feeder, an elongated stationary trough, an elongated substantially flat feed bar slidably mounted within said trough, the bottom of said feed bar slidably engaging the upper surface of the bottom of said trough, means for sliding said feed bar longitudinally along the bottom of said trough with oscillating forward and backward movements, a plurality of pivotal paddles transversely mounted across and spaced along said trough, the distance between each pair of said paddles being less than the distance of oscillatory movement of said feed bar, means for supplying feed to the upper surface of said feed bar, each of said paddles being mounted for limited pivotal movement whereby said paddles are disposed toward a horizontal position with respect to said trough when said feed bar is moved in a forward direction to permit the feed to be carried by said feed bar beneath said paddles along said trough in a forward direction and said paddles are disposed toward a vertical position with respect to said trough when said feed bar is moved in a backward direction to prevent the backward movement of said feed beneath said paddles.

3. The structure described in claim 2, and notch means formed in the upper surface of said feed bar facing the direction of forward movement of said feed bar whereby feed is caught and moved forwardly during the forward movement of said feed bar.

4. In an automatic poultry feeder, an elongated stationary trough, an elongated substantially flat feed bar slidably mounted within said trough, said feed bar comprising a plurality of segments joined at their ends, the bottom of said feed bar slidably engaging the upper surface of the bottom of said trough, the width of said feed bar being substantially equal to the width of the bottom of said trough, means for sliding said feed bar longitudinally along the bottom of said trough with oscillating forward and backward movements, a plurality of pivotal paddles transversely mounted across and spaced along said trough, the distance between each pair of said paddles being less than the distance of oscillatory movement of said feed bar, means for supplying feed to the upper surface of said feed bar, each of said paddles being mounted for limited pivotal movement whereby said paddles are disposed toward a horizontal position with respect to said trough when said feed bar is moved in a forward direction to permit the feed to be carried by said feed bar beneath said paddles along said trough in a forward direction and said paddles are disposed toward a vertical position with respect to said trough when said feed bar is moved in a backward direction to prevent the backward movement of said feed beneath said paddles, and notch means formed in the upper surface of said feed bar and faced in the direction of forward movement of said feed bar whereby the feed is caught and moved forwardly during the forward movement of said feed bar.

References Cited in the file of this patent

UNITED STATES PATENTS

| | | |
|---|---|---|
| 2,683,439 | Markey | July 13, 1954 |
| 2,785,792 | Cordis | Mar. 19, 1957 |
| 2,794,421 | Rose et al. | June 4, 1957 |
| 2,795,313 | Hazen | June 11, 1957 |